United States Patent
Hentschel et al.

(10) Patent No.: US 10,351,100 B1
(45) Date of Patent: Jul. 16, 2019

(54) SECURING A VEHICLE ON AUTHORIZED USER CHANGE

(71) Applicant: FORD GLOBAL TECHNOLOGIES, LLC, Dearborn, MI (US)

(72) Inventors: Jeffrey Lee Hentschel, Novi, MI (US); Kevin F. Militello, South Lyon, MI (US); Kyle Charboneau Zurawski, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/906,553

(22) Filed: Feb. 27, 2018

(51) Int. Cl.
*B60R 25/24* (2013.01)

(52) U.S. Cl.
CPC .......... *B60R 25/243* (2013.01); *B60R 25/246* (2013.01); *B60R 2325/20* (2013.01)

(58) Field of Classification Search
CPC .. B60R 25/243; B60R 25/246; B60R 2325/20
See application file for complete search history.

(56) References Cited

U.S. PATENT DOCUMENTS

| | | | |
|---|---|---|---|
| 7,366,677 B1* | 4/2008 | Liu | B60R 25/00 340/5.25 |
| 2016/0082926 A1* | 3/2016 | Mouser | B60R 25/252 701/2 |
| 2016/0344747 A1* | 11/2016 | Link, II | H04L 63/123 |
| 2017/0104589 A1 | 4/2017 | Lambert et al. | |

* cited by examiner

*Primary Examiner* — Nabil H Syed
(74) *Attorney, Agent, or Firm* — Frank L. Lollo; Brooks Kushman P.C.

(57) ABSTRACT

A memory stores telemetry data for a vehicle. A processor is programmed to send an authorization confirmation request to the vehicle responsive to pattern matching on the telemetry data indicating a potential change in authorization of the vehicle, and send a deauthorization request to an authorization server to deauthorize tokens for the vehicle responsive to a lack of an affirmative response to the authorization confirmation request being received within a predefined time period.

15 Claims, 6 Drawing Sheets

SECURING A VEHICLE ON AUTHORIZED USER CHANGE

TECHNICAL FIELD

Aspects of the disclosure generally relate to securing a vehicle on a change of authorized user of the vehicle.

BACKGROUND

When a user purchases a vehicle, the user may set up the vehicle with a user account. This account may be used to allow the user to start the vehicle using a smartphone, as well as to receive notifications from the manufacturer or the vehicle. The account may be secured by a token, which is provided to a server to verify the authorization of the user. The user account may include personal information of the user, such as a name of the user, a residence location of the user, historical data for the user's use of the vehicle, and/or customizations to the vehicle set by the user.

SUMMARY

In one or more illustrative embodiments, a system includes a memory storing telemetry data for a vehicle and a processor. The processor is programmed to send an authorization confirmation request to the vehicle responsive to pattern matching on the telemetry data indicating a potential change in authorization of the vehicle, and send a deauthorization request to a server to deauthorize tokens for the vehicle responsive to a lack of an affirmative response to the authorization confirmation request being received within a predefined time period.

In one or more illustrative embodiments, a system includes a user interface and a processor of a vehicle. The processor is programmed to send, to the user interface, an authorization confirmation request received from a server responsive to pattern matching on telemetry data sent from the vehicle to the server indicating a potential change in authorization of the vehicle, send a response to the authorization confirmation request received via the user interface to the server to confirm authorization of the vehicle.

In one or more illustrative embodiments, a method includes sending a deauthorization request to an authorization server to deauthorize tokens for a vehicle, responsive to a lack of an affirmative response being received within a predefined time period to an authorization confirmation request sent to the vehicle responsive to pattern matching on telemetry data indicating a potential change in authorization of the vehicle.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

When a user delegates access to a protected device (such as a vehicle) in a typical authorization system, a token will be issued that allows the bearer to access the device. This token is often short-lived and can be refreshed for a given amount of time without user interaction by the provisioning of a refresh token. However, if the protected device changes ownership during this time, the original owner could either unknowingly or maliciously send authorized commands to the vehicle. Unless this information is explicitly given to the new owner on vehicle sale, the new owner may not even be aware of authorized connections which could put the new owner at risk in terms of personal information or safety. Similar issues may occur for vehicle-sharing arrangements, where a vehicle is checked out by another user, while the previous user still has an active token issued to access the vehicle.

Since the user has physical access to the vehicle, so long as the user maintains authorization, the vehicle can provide telemetry information to a change detection controller. This information may be used to detect a possible change in ownership or authorized user. This information could include key-off locations, driving styles, seat positions, and other ways of detecting a possible change. Once detected, the system may alert the vehicle of the potential for an ownership or authorized change, and may request an authorization confirmation from the vehicle. If the user is still the owner or authorized user, then a simple confirmation will allow the owner to maintain authorization. If the vehicle has a new owner or authorized user, then existing authorization may be removed preventing a malicious attack.

Figure 1:
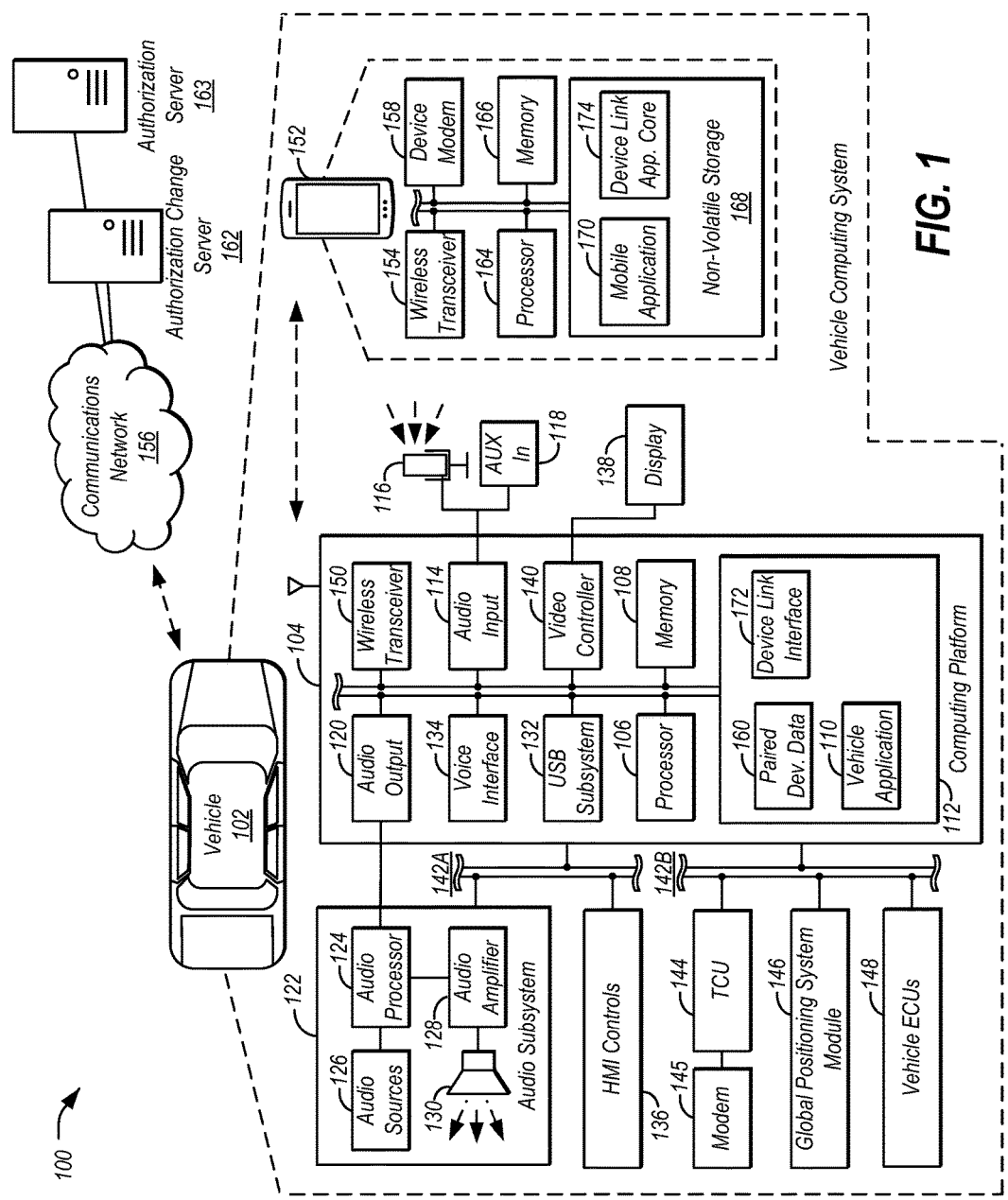
FIG. 1 illustrates an example diagram of a system configured to provide telematics services to a vehicle.

FIG. 1 illustrates an example diagram of a system 100 configured to provide telematics services to a vehicle 102. The vehicle 102 may include various types of passenger vehicle, such as crossover utility vehicle (CUV), sport utility vehicle (SUV), truck, recreational vehicle (RV), boat, plane or other mobile machine for transporting people or goods. Telematics services may include, as some non-limiting possibilities, navigation, turn-by-turn directions, vehicle health reports, local business search, accident reporting, and hands-free calling. In an example, the system 100 may include the SYNC system manufactured by The Ford Motor Company of Dearborn, Mich. It should be noted that the illustrated system 100 is merely an example, and more, fewer, and/or differently located elements may be used.

A computing platform 104 may include one or more processors 106 configured to perform instructions, commands, and other routines in support of the processes described herein. For instance, the computing platform 104 may be configured to execute instructions of vehicle applications 110 to provide features such as navigation, accident reporting, satellite radio decoding, and hands-free calling. Such instructions and other data may be maintained in a non-volatile manner using a variety of types of computer-readable storage medium 112. The computer-readable medium 112 (also referred to as a processor-readable medium or storage) includes any non-transitory medium (e.g., a tangible medium) that participates in providing instructions or other data that may be read by the processor 106 of the computing platform 104. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

The computing platform 104 may be provided with various features allowing the vehicle occupants to interface with the computing platform 104. For example, the computing platform 104 may include an audio input 114 configured to receive spoken commands from vehicle occupants through a connected microphone 116, and an auxiliary audio input 118 configured to receive audio signals from connected devices. The auxiliary audio input 118 may be a physical connection, such as an electrical wire or a fiber optic cable, or a wireless input, such as a BLUETOOTH audio connection or Wi-Fi connection. In some examples, the audio input 114 may be configured to provide audio processing capabilities, such as pre-amplification of low-level signals, and conversion of analog inputs into digital data for processing by the processor 106.

The computing platform 104 may also provide one or more audio outputs 120 to an input of an audio module 122 having audio playback functionality. In other examples, the computing platform 104 may provide platform audio from the audio output 120 to an occupant through use of one or more dedicated speakers (not illustrated). The audio output 120 may include, as some examples, system generated chimes, pre-recorded chimes, navigation prompts, other system prompts, or warning signals.

The audio module 122 may include an audio processor 124 configured to perform various operations on audio content received from a selected audio source 126 and to platform audio received from the audio output 120 of the computing platform 104. The audio processors 124 may be one or more computing devices capable of processing audio and/or video signals, such as a computer processor, microprocessor, a digital signal processor, or any other device, series of devices or other mechanisms capable of performing logical operations. The audio processor 124 may operate in association with a memory to execute instructions stored in the memory. The instructions may be in the form of software, firmware, computer code, or some combination thereof, and when executed by the audio processors 124 may provide audio recognition and audio generation functionality. The instructions may further provide for audio cleanup (e.g., noise reduction, filtering, etc.) prior to the processing of the received audio. The memory may be any form of one or more data storage devices, such as volatile memory, non-volatile memory, electronic memory, magnetic memory, optical memory, or any other form of data storage device.

The audio subsystem may further include an audio amplifier 128 configured to receive a processed signal from the audio processor 124. The audio amplifier 128 may be any circuit or standalone device that receives audio input signals of relatively small magnitude, and outputs similar audio signals of relatively larger magnitude. The audio amplifier 128 may be configured to provide for playback through vehicle speakers 130 or headphones (not illustrated).

The audio sources 126 may include, as some examples, decoded amplitude modulated (AM) or frequency modulated (FM) radio signals, and audio signals from compact disc (CD) or digital versatile disk (DVD) audio playback. The audio sources 126 may also include audio received from the computing platform 104, such as audio content generated by the computing platform 104, audio content decoded from flash memory drives connected to a universal serial bus (USB) subsystem 132 of the computing platform 104, and audio content passed through the computing platform 104 from the auxiliary audio input 118. For instance, the audio sources 126 may also include Wi-Fi streamed audio, USB streamed audio, Bluetooth streamed audio, internet streamed audio, TV audio, as some other examples.

The computing platform 104 may utilize a voice interface 134 to provide a hands-free interface to the computing platform 104. The voice interface 134 may support speech recognition from audio received via the microphone 116 according to a standard grammar describing available command functions, and voice prompt generation for output via the audio module 122. The voice interface 134 may utilize probabilistic voice recognition techniques using the standard grammar in comparison to the input speech. In many cases, the voice interface 134 may include a standard user profile tuning for use by the voice recognition functions to allow the voice recognition to be tuned to provide good results on average, resulting in positive experiences for the maximum number of initial users. In some cases, the system may be configured to temporarily mute or otherwise override the audio source specified by an input selector when an audio prompt is ready for presentation by the computing platform 104 and another audio source 126 is selected for playback.

The microphone 116 may also be used by the computing platform 104 to detect the presence of in-cabin conversations between vehicle occupants. In an example, the computing platform may perform speech activity detection by filtering audio samples received from the microphone 116 to a frequency range in which first formants of speech are typically located (e.g., between 240 and 2400 HZ), and then applying the results to a classification algorithm configured to classify the samples as either speech or non-speech. The classification algorithm may utilize various types of artificial intelligence algorithm, such as pattern matching classifiers, K nearest neighbor classifiers, as some examples.

The computing platform 104 may also receive input from human-machine interface (HMI) controls 136 configured to provide for occupant interaction with the vehicle 102. For instance, the computing platform 104 may interface with one or more buttons or other HMI controls configured to invoke functions on the computing platform 104 (e.g., steering wheel audio buttons, a push-to-talk button, instrument panel controls, etc.). The computing platform 104 may also drive or otherwise communicate with one or more displays 138 configured to provide visual output to vehicle occupants by way of a video controller 140. In some cases, the display 138 may be a touch screen further configured to receive user touch input via the video controller 140, while in other cases the display 138 may be a display only, without touch input capabilities.

The computing platform 104 may be further configured to communicate with other components of the vehicle 102 via one or more in-vehicle networks 142. The in-vehicle networks 142 may include one or more of a vehicle controller area network (CAN), an Ethernet network, and a media oriented system transfer (MOST), as some examples. The in-vehicle networks 142 may allow the computing platform 104 to communicate with other vehicle 102 systems, such as a telematics control unit 144 having an embedded modem, a global positioning system (GPS) module 146 configured to provide current vehicle 102 location and heading information, and various vehicle electronic control units (ECUs) 148 configured to cooperate with the computing platform 104. As some non-limiting possibilities, the vehicle ECUs 148 may include a powertrain control module configured to provide control of engine operating components (e.g., idle control components, fuel delivery components, emissions control components, etc.) and monitoring of engine operating components (e.g., status of engine diagnostic codes); a body control module configured to manage various power control functions such as exterior lighting, interior lighting, keyless entry, remote start, and point of access status verification (e.g., closure status of the hood, doors, and/or trunk of the vehicle 102); a radio transceiver module configured to communicate with key fobs or other local vehicle 102 devices; and a climate control management module configured to provide control and monitoring of heating and cooling system components (e.g., compressor clutch and blower fan control, temperature sensor information, etc.).

As shown, the audio module 122 and the HMI controls 136 may communicate with the computing platform 104 over a first in-vehicle network 142-A, and the telematics control unit 144, GPS module 146, and vehicle ECUs 148 may communicate with the computing platform 104 over a second in-vehicle network 142-B. In other examples, the computing platform 104 may be connected to more or fewer in-vehicle networks 142. Additionally or alternately, one or more HMI controls 136 or other components may be connected to the computing platform 104 via different in-vehicle networks 142 than shown, or directly without connection to an in-vehicle network 142.

The computing platform 104 may also be configured to communicate with mobile devices 152 of the vehicle occupants. The mobile devices 152 may be any of various types of portable computing device, such as cellular phones, tablet computers, smart watches, laptop computers, portable music players, or other devices capable of communication with the computing platform 104. In many examples, the computing platform 104 may include a wireless transceiver 150 (e.g., a BLUETOOTH module, a ZIGBEE transceiver, a Wi-Fi transceiver, an IrDA transceiver, an RFID transceiver, etc.) configured to communicate with a compatible wireless transceiver 154 of the mobile device 152. Additionally or alternatively, the computing platform 104 may communicate with the mobile device 152 over a wired connection, such as via a USB connection between the mobile device 152 and the USB subsystem 132. In some examples, the mobile device 152 may be battery powered, while in other cases the mobile device 152 may receive at least a portion of its power from the vehicle 102 via the wired connection.

A communications network 156 may provide communications services, such as packet-switched network services (e.g., Internet access, VoIP communication services), to devices connected to the communications network 156. An example of a communications network 156 may include a cellular telephone network. Mobile devices 152 may provide network connectivity to the communications network 156 via a device modem 158 of the mobile device 152. To facilitate the communications over the communications network 156, mobile devices 152 may be associated with unique device identifiers (e.g., mobile device numbers (MDNs), Internet protocol (IP) addresses, etc.) to identify the communications of the mobile devices 152 over the communications network 156. In some cases, occupants of the vehicle 102 or devices having permission to connect to the computing platform 104 may be identified by the computing platform 104 according to paired device data 160 maintained in the storage medium 112. The paired device data 160 may indicate, for example, the unique device identifiers of mobile devices 152 previously paired with the computing platform 104 of the vehicle 102, such that the computing platform 104 may automatically reconnected to the mobile devices 152 referenced in the paired device data 160 without user intervention.

When a mobile device 152 that supports network connectivity is paired with and connected to the computing platform 104, the mobile device 152 may allow the computing platform 104 to use the network connectivity of the device modem 158 to communicate over the communications network 156 with various remote computing devices. In one example, the computing platform 104 may utilize a data-over-voice plan or data plan of the mobile device 152 to communicate information between the computing platform 104 and the communications network 156. Additionally or alternately, the computing platform 104 may utilize the telematics control unit 144 to communicate information between the computing platform 104 and the communications network 156, without use of the communications facilities of the mobile device 152.

Similar to the computing platform 104, the mobile device 152 may include one or more processors 164 configured to execute instructions of mobile applications 170 loaded to a memory 166 of the mobile device 152 from storage medium 168 of the mobile device 152. In some examples, the mobile applications 170 may be configured to communicate with the computing platform 104 via the wireless transceiver 154 and with various network services via the device modem 158.

The authorization change server 162 may include various types of computing apparatus, such as a computer workstation, a server, a desktop computer, a virtual server instance executed by a mainframe server, or some other computing system and/or device. Similar to the computing platform 104, the authorization change server 162 may include a memory on which computer-executable instructions may be maintained, where the instructions may be executable by one or more processors of the authorization change server 162. As discussed in detail below, the authorization change server 162 may be configured to identify authorization or other owner change events in vehicles 102, as well as request adjustments to authorization of the vehicles 102.

The authorization server 163 may include various types of computing apparatus, such as a computer workstation, a server, a desktop computer, a virtual server instance executed by a mainframe server, or some other computing system and/or device. Similar to the computing platform 104, the authorization server 163 may include a memory on which computer-executable instructions may be maintained, where the instructions may be executable by one or more processors of the authorization server 163. As discussed in detail below, the authorization server 163 may be configured to receive and apply adjustments to authorizations of vehicles 102, as well as to confirm that users are authorized to perform various commands with vehicles 102.

The computing platform 104 may also include a device link interface 172 to facilitate the integration of functionality of the mobile applications 170 configured to communicate with a device link application core 174 executed by the mobile device 152. In some examples, the mobile applications 170 that support communication with the device link interface 172 may statically link to or otherwise incorporate the functionality of the device link application core 174 into the binary of the mobile application 170. In other examples, the mobile applications 170 that support communication with the device link interface 172 may access an application programming interface (API) of a shared or separate device link application core 174 to facilitate communication with the device link interface 172.

The integration of functionality provided by the device link interface 172 may include, as an example, the ability of mobile applications 170 executed by the mobile device 152 to incorporate additional voice commands into the grammar of commands available via the voice interface 134. The device link interface 172 may also provide the mobile applications 170 with access to vehicle information available to the computing platform 104 via the in-vehicle networks 142. The device link interface 172 may further provide the mobile applications 170 with access to the vehicle display 138. An example of a device link interface 172 may be the SYNC APPLINK component of the SYNC system provided by the Ford Motor Company of Dearborn, Mich. Other examples of device link interfaces 172 may include MIRRORLINK, APPLE CARPLAY, and ANDROID AUTO.

Figure 2:
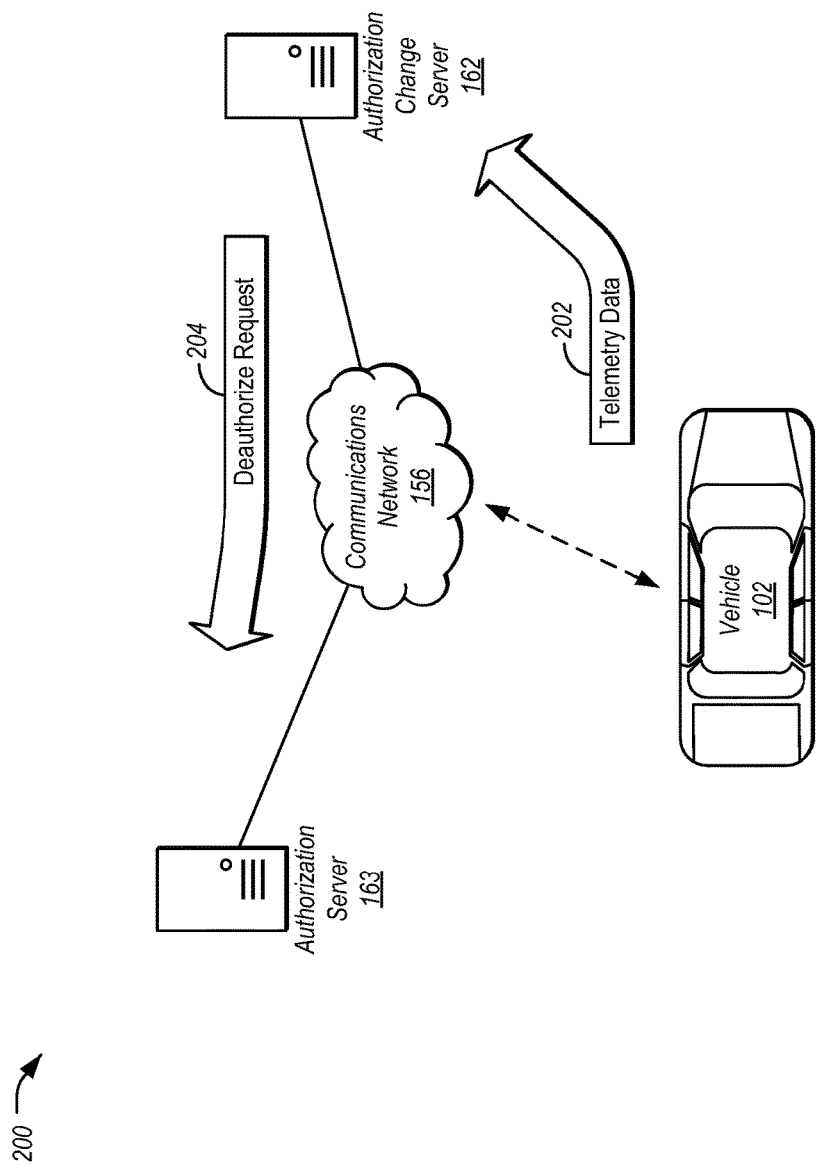
FIG. 2 illustrates an example diagram of communication of telemetry data and deauthorization requests in relation to a vehicle.

FIG. 2 illustrates an example diagram 200 of communication of telemetry data 202 and deauthorization requests 204 in relation to a vehicle 102. As shown, the vehicle 102 may send the telemetry data 202 to the authorization change server 162. The telemetry data 202 may include location and user preference information. As some examples, the telemetry data 202 may include GPS location of the vehicle 102, a driver style of the vehicle 102, seat position information for the drier seat of the vehicle 102, as some possibilities. The authorization change server 162 may receive the telemetry data 202, and based on the telemetry data 202, may request confirmation of ownership or other authorization to use the vehicle 102. Aspects of the confirmation request are discussed in further detail with regard to FIGS. 3-4. If an authorization change is detected, then the authorization change server 162 may send the deauthorization request 204 to the authorization server 163. Responsive to receipt of the deauthorization request 204, the authorization server 163 may invalidate any authorization tokens that are unexpired and issued to the vehicle 102. This may prevent a token that was received by a prior owner or vehicle-share user of the vehicle 102 (or a refreshed version of that token) from being used to perform vehicle 102 commands. For example, this revocation of the token may prevent the former owner or vehicle-share user from using a token stored to his mobile device to unlock doors of the vehicle 102 that was sold.

Figure 3:
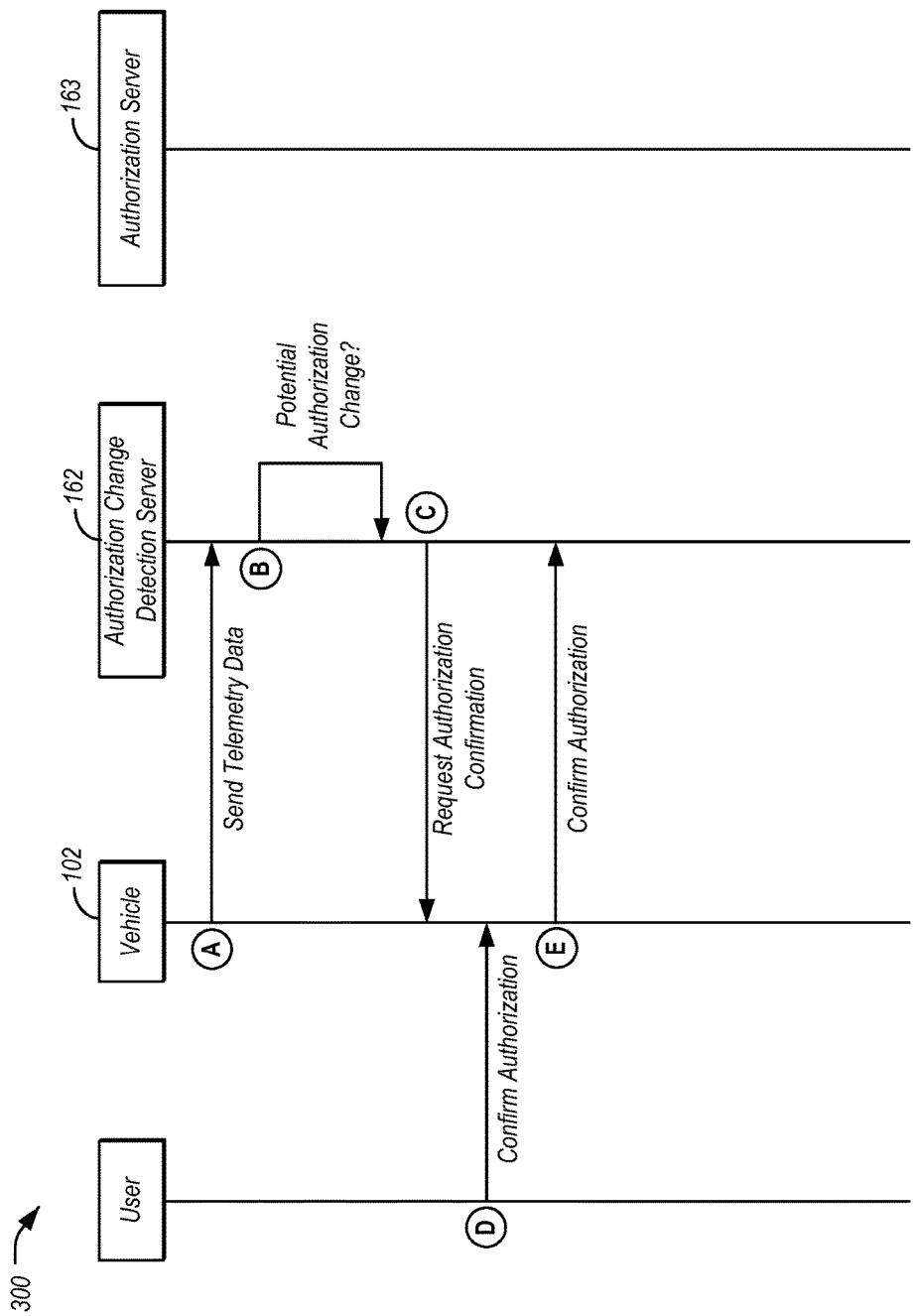
FIG. 3 illustrates an example data flow diagram of a user confirming authorization of a vehicle.

FIG. 3 illustrates an example data flow diagram 300 of a user confirming authorization of a vehicle 102. At time index (A) the vehicle 102 sends telemetry data 202 to the authorization change detection server 162. In an example, the computing platform 104 of the vehicle 102 may collect GPS location and other data from the vehicle buses 142, and may provide that information to the TCU 144 for transmission by the modem 145 over the communication network 156 to the authorization change detection server 162. The telemetry data 202 may be received by the change detection server 162.

At time index (B), the change detection server 162 identifies a potential authorization change of the vehicle 102. In an example, the change detection server 162 may compare the received telemetry data 202 to historical telemetry data 202 received from the same vehicle 102. For instance, the change detection server 162 may compare aspects of the telemetry data 202, such as key-off locations, driving styles, seat positions to determine whether the driver of the vehicle 102 may have changed. As one possibility, the change detection server 162 may utilize various pattern matching or artificial intelligence techniques to identify a difference in aspects of the telemetry data 202 that may signify a potential change in owner or vehicle-share user. These techniques may include, as some non-limiting examples, sum of absolute differences (SAD), sum of squared difference (SSD), normalized cross correlation (NCC), or k-nearest neighbors algorithm (k-NN).

At time index (C), the change detection server 162 sends a request for authorization confirmation to the vehicle 102. The authorization confirmation request may be configured to cause the vehicle 102 to request the user to confirm ownership or authorization of the vehicle 102. In a simple example, the authorization confirmation may simply require that the user confirm that the user is still the owner or vehicle-share user of the vehicle 102. In another example, the authorization confirmation may require the user to confirm details of the ownership or vehicle-sharing, such as to provide a password, a birthdate of the user, a home address of the user, a home zip code of the user, an answer to a security question set up by the user, or other information to authenticate that the user is the true owner or authorized user of the vehicle 102. The vehicle 102 may receive the request for authorization confirmation and may present the authorization request to the user. For instance, the vehicle 102 may present the authorization request to the user via the display 138 and/or via the audio subsystem 122.

At time index (D), the vehicle 102 receives confirmation of authorization of the vehicle 102. In an example, the user may select that the user is, in fact, the owner or vehicle-share user of the vehicle 102 via the HMI controls 136 or display 138 of the vehicle 102. In another example, the user may provide a voice command via the microphone 116 feeding to the voice interface 134 of the computing platform 104.

At time index (E), the vehicle 102 confirms authorization of the vehicle 102 to the change detection server 162. Thus, responsive to receipt of the request for authorization confirmation from the change detection server 162, the vehicle 102 responds to the change detection server 162 with the response to the request that was received to the vehicle 102 from the user. Accordingly, the user may confirm that the vehicle 102 is still with the same ownership or vehicle sharing, despite the identification of a possible change in ownership or vehicle sharing identified by the change detection server 162.

Figure 4:
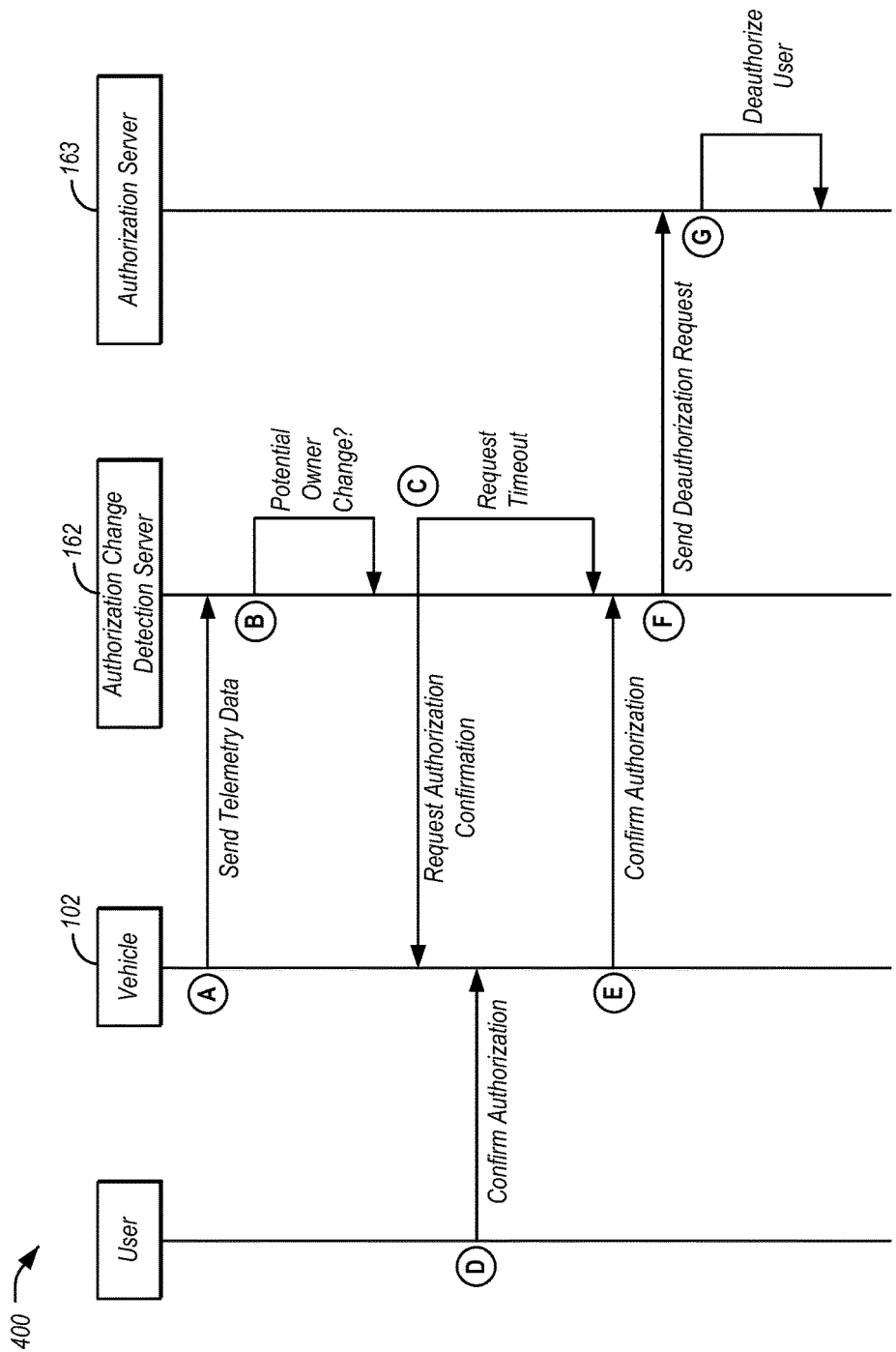
FIG. 4 illustrates an example data flow diagram of a user failing to confirm authorization of the vehicle.

FIG. 4 illustrates an example data flow diagram 400 of a user failing to confirm ownership of the vehicle 102. Similar to as shown in the flow diagram 300, the illustrated confirmation is requested responsive to an authorization confirmation request from the authorization change detection server 162.

Similar to the data flow diagram 300, at time index (A) the vehicle 102 sends telemetry data 202 to the authorization change detection server 162, and at time index (B) the change detection server 162 identifies a potential ownership or vehicle-share user change of the vehicle 102. Also similar to the data flow diagram 300, at time index (C) the change detection server 162 sends a request for authorization confirmation to the vehicle 102. Additionally, at time index (C), the change detection server 162 initiates a request timeout period during which a response to the authorization confirmation request must be received by the change detection server 162 in order to preserve authorization of tokens currently authorized for the vehicle 102.

Again similar to the data flow diagram 300, at time index (D) the vehicle 102 receives confirmation of authorization of the vehicle 102, while at time index (E) the vehicle 102 confirms authorization of the vehicle 102 to the change detection server 162. However, as compared to the data flow diagram 300, in the data flow diagram 400 the authorization confirmation from the vehicle 102 is received by the authorization change detection server after expiration of the request timeout set at time index (C). Accordingly, because the authorization confirmation from the vehicle 102 was not timely, the change detection server 162 determines that authorization was not confirmed.

At time index (F), the change detection server 162 sends a deauthorization request 204 to the authorization server 163. The deauthorization request 204 may specify an indication of the vehicle 102 (e.g., VIN or other identifier of the vehicle 102), to cause the authorization server 163 to be able to identify which vehicle 102 tokens are no longer to be honored. The authorization server 163 receives the deauthorization request 204, and deauthorizes any tokens currently available for the vehicle 102.

Figure 5:
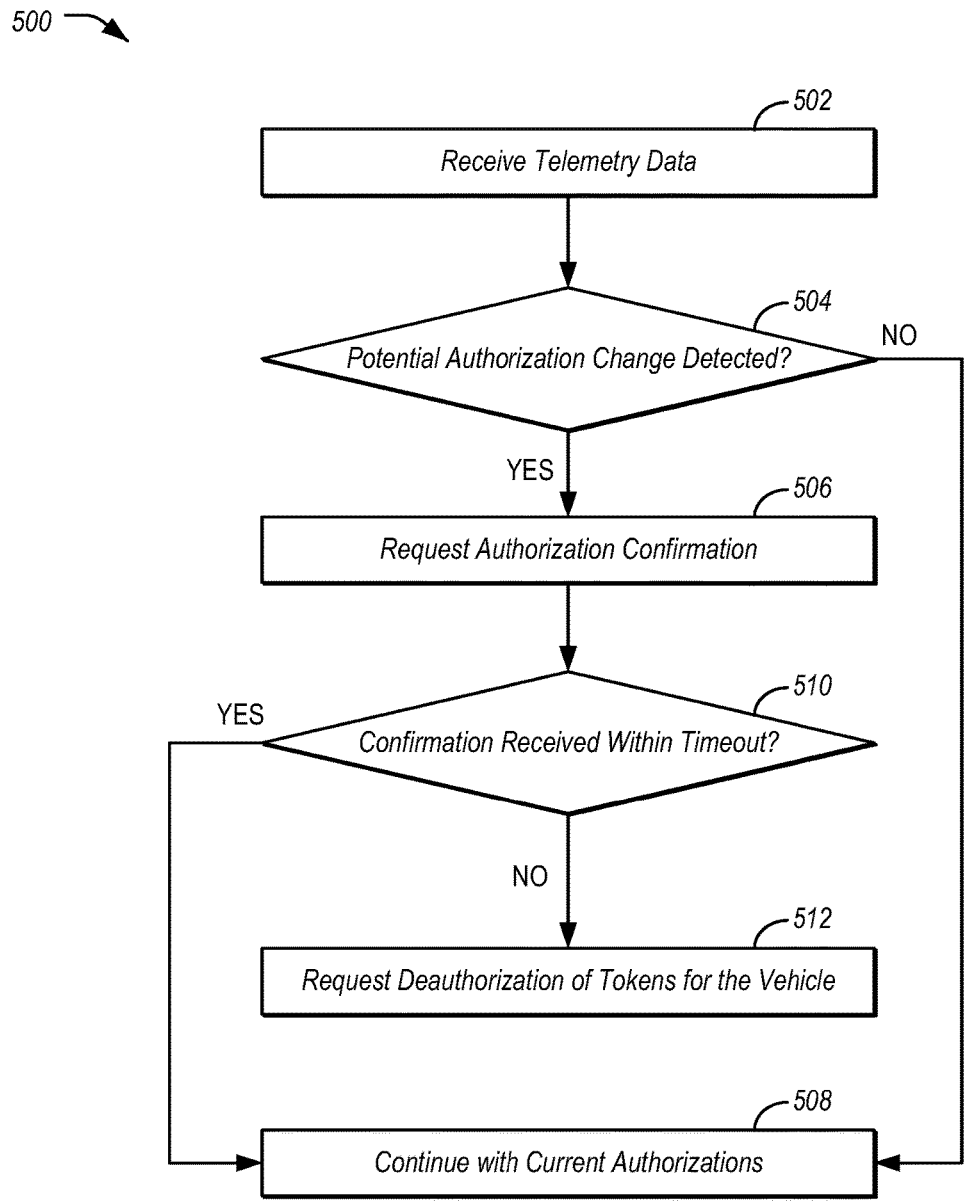
FIG. 5 illustrates an example process for operation of the authorization change server for communication of telemetry data and deauthorization requests for a vehicle.

FIG. 5 illustrates an example process 500 for operation of the authorization change server 162 for communication of telemetry data 202 and deauthorization requests 204 for a vehicle 102. At operation 502, the authorization change server 162 receives telemetry data 202 from the vehicle 102. At operation 504, the authorization change server 162 determines whether a potential owner change or authorized user change is detected. If so, control passes to operation 506 to request an authorization confirmation from the vehicle 102. If not, the authorization change server 162 allows the authorization server 163 to continue with current authorizations at operation 508. At operation 510, following operation 506, the authorization change server 162 determines whether a confirmation of the authorization was received within the predefined timeout period. If so, the authorization change server 162 allows the authorization server 163 to continue with current authorizations at operation 508. If not, the authorization change server 162 sends a request to the authorization server 163 to deauthorize tokens for the vehicle 102.

Figure 6:
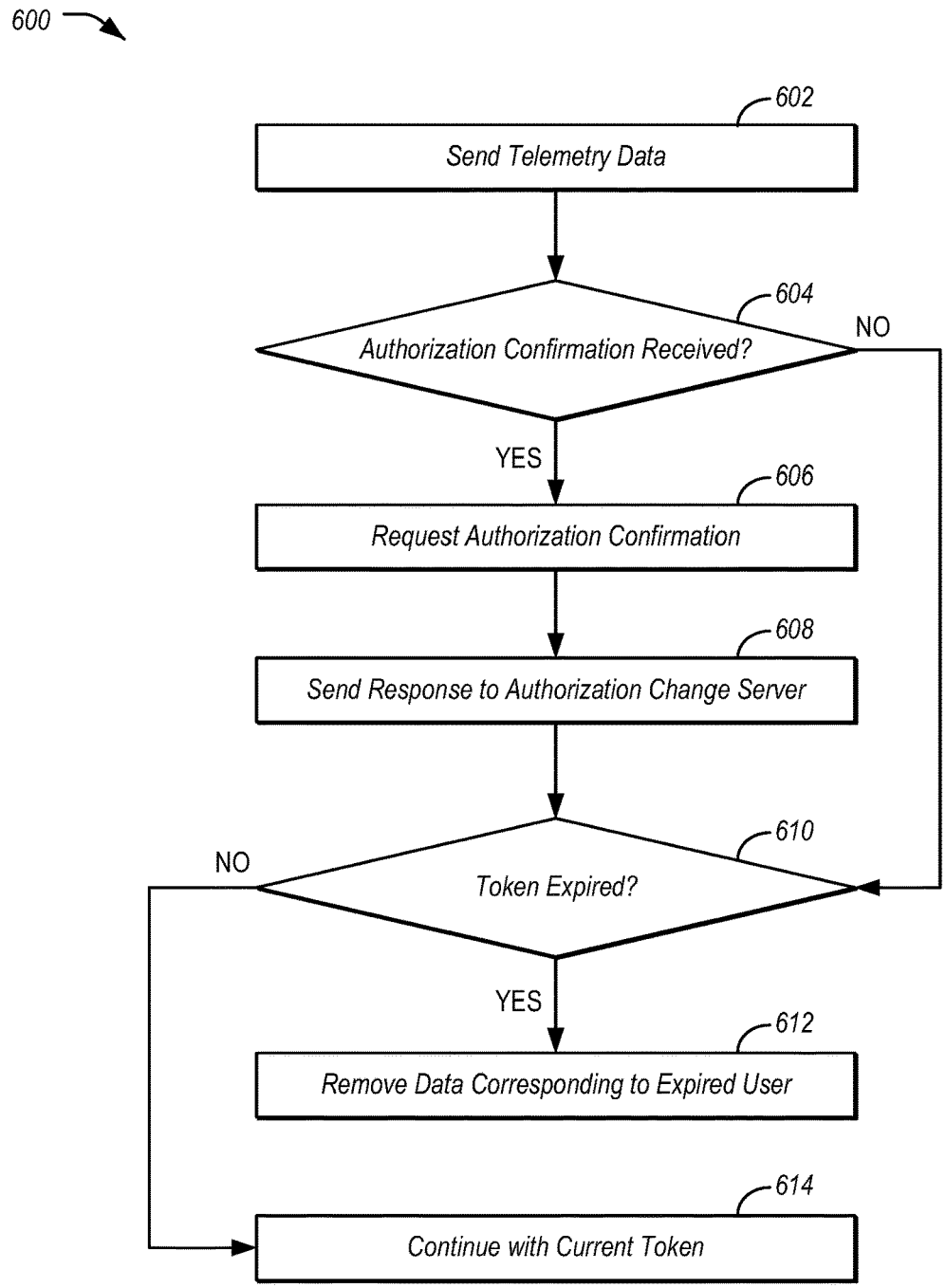
FIG. 6 illustrates an example process for operation of the vehicle in communication with the authorization change server for communication of telemetry data and deauthorization requests.

FIG. 6 illustrates an example process 600 for operation of the vehicle 102 in communication with the authorization change server 162 for communication of telemetry data 202 and deauthorization requests 204. At operation 602, the vehicle 102 sends the telemetry data 202 to the authorization change server 162. At operation 604, the vehicle 102 determines whether a request for an authorization confirmation was received by the vehicle 102 from the authorization change server 162. If so, control passes to operation 606 to request authorization confirmation from the user of the vehicle 102, e.g., using the display 138 or audio system of the vehicle 102. A response to the authorization confirmation may be received by the vehicle 102 as a voice command via the microphone 116 feeding to the voice interface 134 of the computing platform 104 or via the HMI controls 136 or display 138. The response is sent by the vehicle 102 to the authorization change server 162 at operation 608.

At operation 610, which may follow operation 608 or a negative determination at operation 604, the vehicle 102 determines whether any tokens have expired. For instance, the vehicle 102 may confirm authorization of a user to use the vehicle 102 by confirming a token stored to the vehicle 102 with the authorization server 163. If the authorization server 163 returns a response indicating that the token has been deauthorized (e.g., responsive to the request at operation 512 of the process 500), then control passes to operation 612 to remove data corresponding to the expired user. For instance, any address book settings (or other user-specific data) cached by the vehicle 102 for the user may be erased by the vehicle 102, as that user is no longer an authorized user of the vehicle due to the ownership or vehicle-sharing user change. If, however, the token is not determined to be expired at operation 610, control passes to operation 614 to continue with use of the current token and current user.

Computing devices described herein generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, C#, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
a memory storing telemetry data for a vehicle; and
a processor programmed to
send an authorization confirmation request to the vehicle responsive to pattern matching on the telemetry data indicating a potential change in authorization of the vehicle, and
send a deauthorization request to a server to deauthorize tokens for the vehicle responsive to a lack of an affirmative response to the authorization confirmation request being received within a predefined time period.

2. The system of claim 1, wherein the processor is further programmed to perform the pattern matching using one or more of key-off locations, driving styles, or seat positions indicated by the telemetry data.

3. The system of claim 1, wherein the processor is further programmed to perform the pattern matching using one or more of a sum of absolute differences (SAD) algorithm, a sum of squared difference (SSD) algorithm, a normalized cross correlation (NCC) algorithm, or a k-nearest neighbors (k-NN) algorithm.

4. The system of claim 1, wherein the pattern matching indicates one or more of a change in key-off locations, a change in driving style, or a change in seat position.

5. The system of claim 1, wherein the authorization confirmation request is configured to request confirmation of one or more details of the authorization of the vehicle, the details including one or more of a password, a birthdate of a user, a home address of a user, a home zip code of a user, or an answer to a security question set up by the user.

6. The system of claim 1, wherein the authorization confirmation request is configured to cause the vehicle to provide a prompt indicating the authorization confirmation request using a human-machine interface of the vehicle.

7. The system of claim 1, wherein at least one of the tokens for the vehicle is stored to a mobile device configured to send telematics requests to the vehicle over a communications network.

8. The system of claim 1, wherein at least one of the tokens for the vehicle is stored to the vehicle and configured to provide the vehicle with access to settings of a user of the vehicle.

9. The system of claim 1, wherein the deauthorization request is configured to cause the server to prohibit refresh of the tokens.

10. The system of claim 1, wherein the potential change in authorization is a potential change in ownership of the vehicle.

11. The system of claim 1, wherein the potential change in authorization is a potential change in vehicle-sharing user of the vehicle.

12. A method comprising:
sending a deauthorization request to an authorization server to deauthorize tokens for a vehicle, responsive to a lack of an affirmative response being received within a predefined time period to an authorization confirmation request sent to the vehicle responsive to pattern matching on telemetry data indicating a potential change in authorization of the vehicle.

13. The method of claim 12, further comprising one or more of:
performing the pattern matching using one or more of key-off locations, driving styles, or seat positions indicated by the telemetry data, wherein the pattern matching indicates one or more of a change in key-off locations, a change in driving style, or a change in seat position; and
performing the pattern matching using one or more of a sum of absolute differences (SAD) algorithm, a sum of squared difference (SSD) algorithm, a normalized cross correlation (NCC) algorithm, or a k-nearest neighbors (k-NN) algorithm.

14. The method of claim 12, the authorization confirmation request requesting the vehicle to provide a prompt indicating the authorization confirmation request using a human-machine interface of the vehicle, the prompt requesting confirmation of one or more details of the authorization of the vehicle, the details including one or more of a password, a birthdate of a user, a home address of a user, a home zip code of a user, or an answer to a security question set up by the user.

15. The method of claim 12, further comprising configuring the deauthorization request to cause the authorization server to prohibit refresh of the tokens, and one or more of:
storing at least one of the tokens for the vehicle to a mobile device for sending telematics requests to the vehicle over a communications network, or
storing at least one of the tokens to the vehicle for providing the vehicle with access to settings of a user of the vehicle.

\* \* \* \* \*